Feb. 23, 1943.   H. H. MAXIM   2,311,676
SILENCER
Filed July 2, 1941   3 Sheets-Sheet 1
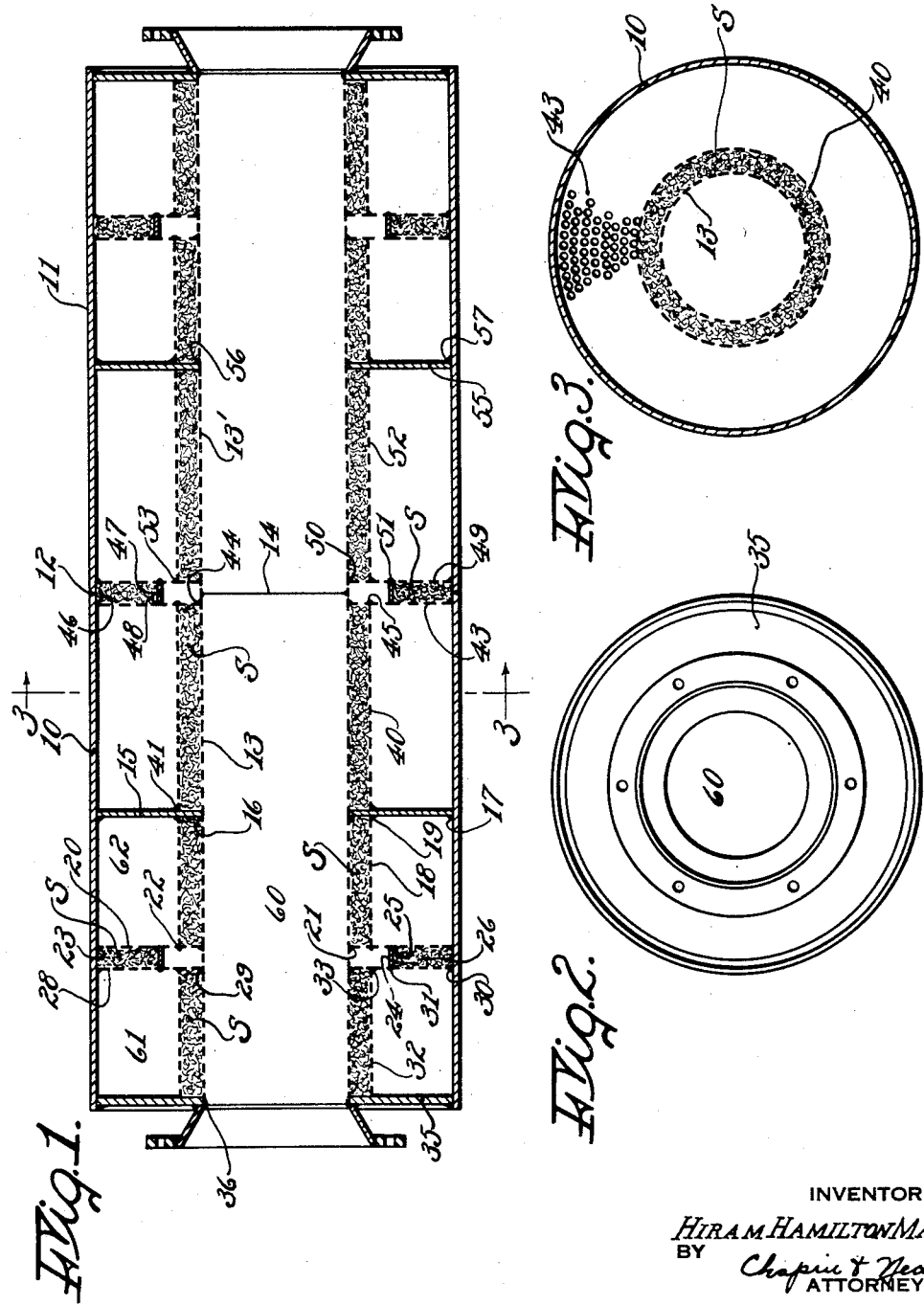
INVENTOR
HIRAM HAMILTON MAXIM
BY Chapin & Neal
ATTORNEYS

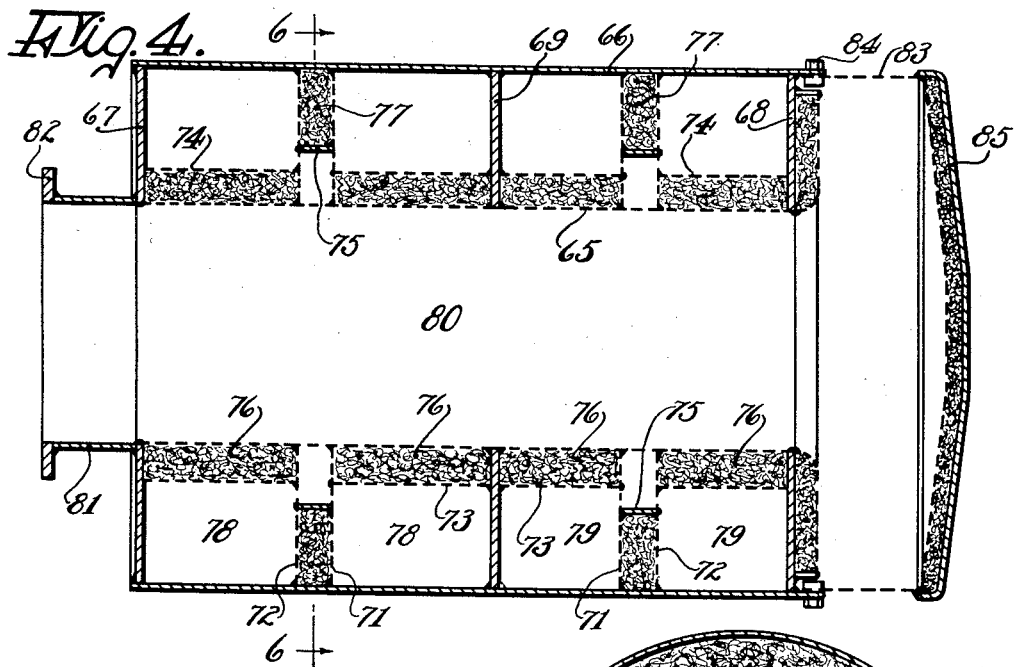
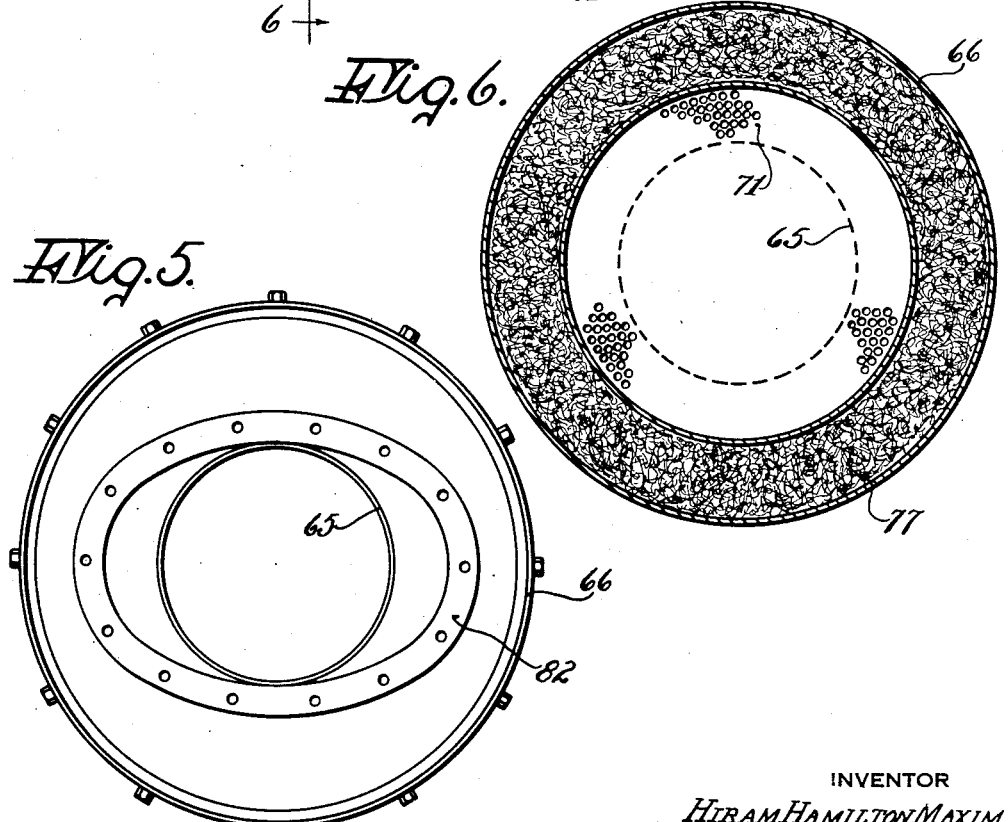

Feb. 23, 1943.  H. H. MAXIM  2,311,676
SILENCER
Filed July 2, 1941   3 Sheets-Sheet 3
Fig. 7.
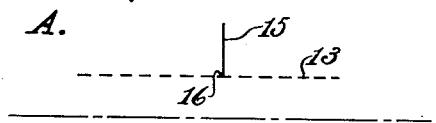
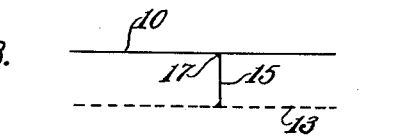
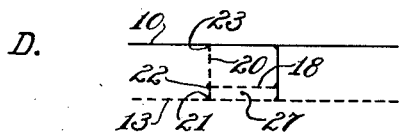
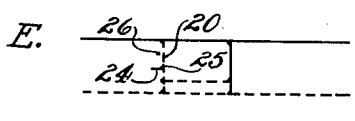
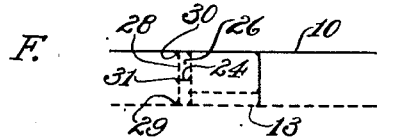
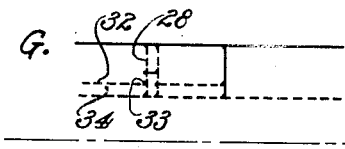
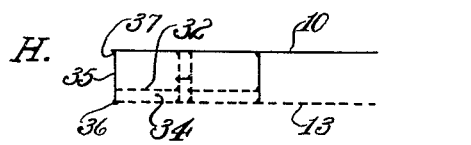
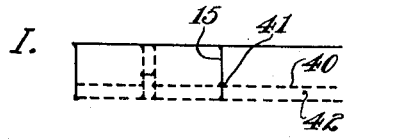
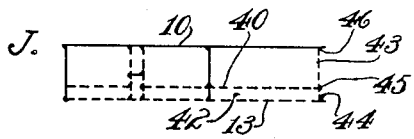
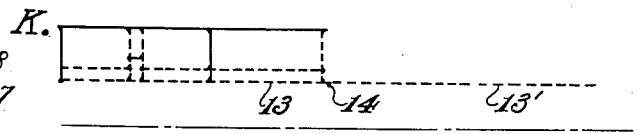
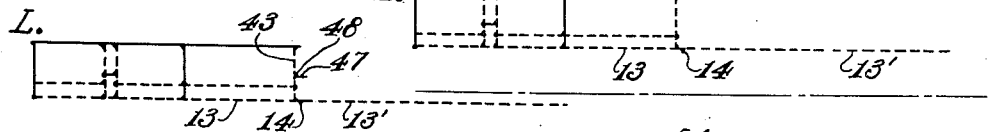
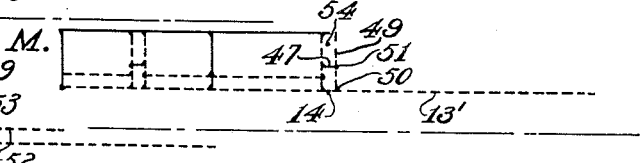
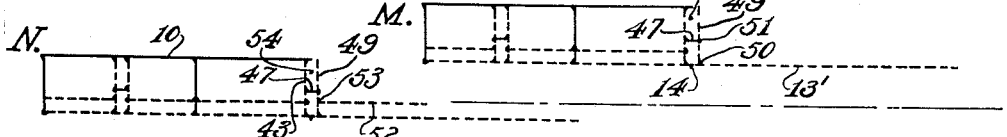
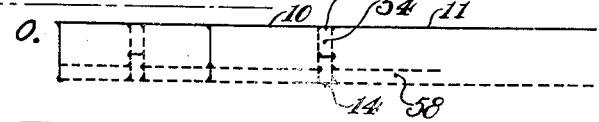
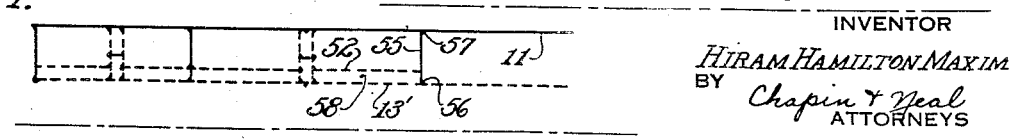
INVENTOR
HIRAM HAMILTON MAXIM
BY Chapin & Neal
ATTORNEYS Patented Feb. 23, 1943

2,311,676

UNITED STATES PATENT OFFICE 2,311,676

SILENCER

Hiram Hamilton Maxim, Hartford, Conn., assignor to The Maxim Silencer Company, Hartford, Conn., a corporation of Connecticut Application July 2, 1941, Serial No. 400,787

5 Claims. (Cl. 181—48)

This invention relates to silencers of the types described in the Bourne Patent 2,043,731, June 9, 1936, and in the Bourne applications for patent Serial Nos. 90,662, filed July 5, 1936, and 367,054, filed November 25, 1940. One object of the invention is to provide a novel construction of silencers of the type having a layer of sound absorbing material between a main sound conducting channel and an annular chamber, in which the annular chamber is divided by solid partitions into discrete resonators which in turn have pervious partitions of sound absorbing material. In particular the invention relates to the construction of large size silencers as described in the last named application, in which coupling between the main channel and each resonator is through a layer of sound absorbing material in parallel with a localized unrestricted opening. Additional objects will appear from the following description and claims.

Referring to the drawings,

Fig. 1 is a central longitudinal section through a silencer constructed in accordance with the invention;

Fig. 2 is an end view;

Fig. 3 is a section on line 3—3 of Fig. 1;

Fig. 4 is a longitudinal section through a modification;

Fig. 5 is an end view thereof;

Fig. 6 is a section on line 6—6 of Fig. 4; and

Fig. 7 is a diagram showing successive steps, lettered A to P, in the assembly of the silencer of Fig. 1.

In the construction of silencers of large pipe size, such as those intended for pipes of 10—16 inch diameter or larger, the problem of manufacture takes on aspects wholly different from those encountered in smaller sizes. The outer diameter of the silencer must generally be restricted in size as much as possible, so that even for a silencer having a 13" straight through passage the outside diameter may be no more than 30". This does not permit internal welding to be carried on with freedom except near an open end of the shell, and necessitates special constructions to permit the welding to be accessible and yet to permit all parts to be secured rigidly in place.

The invention will be described with particular relation to an intake silencer intended for use in a 16" pipe line, conditions permitting the size to be reduced to 13" during passage of the air through the silencer. The outer shell is divided symmetrically into two halves 10 and 11, to be finally united by a circumferential or girth weld 12. Associated with each half of the casing is a perforated tube 13 and 13', which may be integral if desired, the two halves ultimately being welded together along a circumferential line 14. For clarity in the drawings perforated metal is indicated by dash lines.

The first step in assembly is to weld a header 15 to the tube 13 at 16 (Fig. 7A), insert the tube and header into the shell 10 and weld the header to the shell at 17 (Fig. 7B). A perforated tube 18 is then welded to the header 15 at 19 (Fig. 7C), and the space between tubes 13 and 18 filled with felt, metallic wool, or other sound absorbing material S. A perforated header 20 is then slipped in place over the tube 13 until it strikes part 18, and is welded to the tube 13 at 21, to tube 18 at 22, and to the shell 10 to 23 (Fig. 7D). The weld at 22 can be accomplished by welding through the perforations in the header 20. A solid steel hoop 24 is then welded to the header 20 at 25 (Fig. 7E) forming an open-sided pocket 26 into which sound absorbing material S is packed in the same manner as in the pocket 27 bounded by tubes 13 and 18 and header 15 (Fig. 7C). A perforated header 28 (Fig. 7F) is then slid over the tube 13 and is welded thereto at 29, to the shell 10 at 30, and to the hoop 24 at 31. A perforated tube 32 is welded to the header 28 at 33 (Fig. 7G), forming a pocket 34 into which sound absorbing material S is then packed. The whole is then closed by an imperforate annular header 35 (Fig. 7H) which may be welded to the central tube 13 at 36 and to the shell 10 at 37. Since the header is imperforate no weld can conveniently be made to tube 32, but this does not noticeably impair the rigidity of the structure.

Construction from the header 15 in one direction having been completed, assembly of the half silencer starts in the opposite direction. The first step is the welding of a perforated tube 40 at 41 to the header 15 (Fig. 7I). A pocket 42 is thus formed which is packed with sound absorbing material S. A perforated header 43 is slipped over the end of tube 13 and welded to it at 44, to tube 40 at 45, and to shell 13 at 46 (Fig. 7J). The next step is to put in place the second half 13' of the inner perforated tube (Fig. 7K) if the halves were not initially integral, the two halves being welded circumferentially at 14. A short imperforate hoop 47 is then welded to the header 43 at 48 (Fig. 7L) and a perforate header 49 welded to the tube 13' at 50 and hoop 47 at 51 (Fig. 7M). A perforated tube 52 is then welded to header 49 at 53 (Fig. 7N) and the pocket 54 formed by members 47, 49, 10, and 43 is filled with sound absorbing material S. This pocket is closed by sliding the second half 11 of the outer shell in place and welding it in place at 12 (Fig. 7O). An imperforate header 55 is now welded to sleeve 13' at 56 and to shell 11 at 57 (Fig. 7P), the pocket 58 having first been filled with sound absorbing material S. As the header is imperforate it cannot conveniently be welded to tube 52. The remainder of the silencer is formed by proceeding from the header 55 outwardly to the right exactly as in the assembly first described from header 15 to the left and need not be considered in detail.

It should be observed that the silencer is formed with a continuous inner tube from which the partitions, both perforate and imperforate, extend all the way to the outer shell. The perforate partitions are arranged in pairs joined by a preferably imperforate tube. This construction has several advantages. The perforate partitions form closures for the annular cylindrical pockets, like 27 and 34, which when filled with sound absorbing material acting as a resistive coupling between the central sound conducting channel 60 and the annular chambers 61 and 62. At the same time these partitions support and form part of the annular discoid pocket 26 which when filled with sound absorbing material acts as a pervious partition joining the chambers 61 and 62 which form part of a single sidebranch extending between headers 15 and 35. By reason of their perforate character these partitions, plus the portion of the perforate tube 13 between them, also furnish a direct coupling from the main channel and the two halves of the sidebranch. The main acoustical features of this type of silencer are that coupling is maintained between the main channel and the sidebranch both directly through an unrestricted opening and resistively through a body of sound absorbing material; and that a partition of sound absorbing material is interposed between the ends of the sidebranch to prevent the formation of standing waves.

A similar construction embodying two instead of three sidebranches, and particularly adapted for intake silencing, is shown in Figs. 4, 5, and 6. The central perforate tube 65 and the outer cylindrical shell 66 are joined by end headers 67, 68, and by an intermediate header 69. Between the intermediate header 69 and each end header are a pair of perforate partitions 71, 72 joining the tube and shell. Partition 69 is joined to each partition 71 by a perforate tube 73, while each partition 72 is joined to the adjacent end header by a perforate tube 74. Each adjacent pair of headers 71, 72 are joined by a cylindrical hoop 75 which may be imperforate. The annular cylindrical pockets 76 and the annular discoid pockets 77 thus formed are packed with sound absorbing material, the former furnishing a resistive coupling into the sidebranch chambers 78, 79 and the latter a pervious mass at an intermediate point of said chambers. Direct coupling between the central conduit 80 and the chambers occurs through the perforated tube 65 and headers 71, 72 in the space directly within the hoop 75. Beyond one end of the central tube a conduit 81 is secured, furnished with any suitable attaching flange 82. At the other end a cylindrical perforate tube 83 is secured to shell 66 as by bolts 84, and has its end closed by an imperforate header 85, preferably dish-shaped. The header 85, and preferably the outer side of header 68, are lined with a perforated sheet holding sound absorbing material in place. A radial inlet passage is thus formed communicating with the central passage 80 and lined with sound absorbing material to aid in the attenuation of high frequency sounds. The assembly of this silencer is similar to the preceding form, the header 69 being first assembled with the tube 65 and shell 66 and the remaining parts successively added from opposite ends.

I claim:

1. A silencer comprising a cylindrical shell, a central perforate tube, imperforate header joining the tube and shell, a pair of intermediate perforate headers joining the tube and shell, a pair of perforate tubes each joining a perforate and an imperforate header to form with the central tube an annular cylindrical pocket, a tube of larger diameter than said pair of perforate tubes joining the perforate headers to form with them and the outer shell an annular discoid pocket spaced from the cylindrical pockets, and sound absorbing material within the cylindrical and discoid pockets.

2. A silencer comprising a cylindrical shell, a central perforate tube, imperforate end headers and a pair of imperforate intermediate headers joining the tube and shell, a pair of perforate headers joining the tube shell intermediate each pair of imperforate headers, a perforate tube between and joining each consecutive pair of perforate and imperforate headers to form with the central tube an annular cylindrical pocket, a tube of larger diameter than said perforate tubes joining each consecutive pair of perforate headers to form with them and the outer shell an annular discoid pocket spaced from the cylindrical pockets, and sound absorbing material within the cylindrical and discoid pockets.

3. A silencer comprising a cylindrical shell, a central perforate tube, imperforate end headers and a pair of imperforate intermediate headers joining the tube and shell, a pair of perforate headers joining the tube and shell intermediate each pair of imperforate headers, a perforate tube between and joining each consecutive pair of perforate and imperforate headers to form with the central tube an annular cylindrical pocket, a tube of larger diameter than said perforate tubes joining each consecutive pair of perforate headers to form with them and the outer shell an annular discoid pocket spaced from the cylindrical pockets, and sound absorbing material within the cylindrical and discoid pockets, the outer shell being circumferentially seamed between the central pair of perforate headers.

4. A silencer comprising a cylindrical shell, a central perforate tube, imperforate end headers and at least one intermediate imperforate header, a pair of perforate headers joining the tube and shell intermediate each pair of imperforate headers, a perforate tube between and joining each consecutive pair of perforate and imperforate headers to form with the central tube an annular cylindrical pocket, a tube of larger diameter than the perforate tubes joining each consecutive pair of perforate headers to form with them and the outer shell an annular discoid pocket spaced from the cylindrical pockets, and sound absorbing material within said cylindrical and discoid pockets, the groups of headers and partitions on opposite sides of each intermediate imperforate header being secured together by joints located on the sides of the headers remote from said imperforate header.

5. An intake silencer comprising a cylindrical imperforate shell, a central perforate tube, a plurality of imperforate headers joining the tube and shell, a pair of perforate headers intermediate each consecutive pair of imperforate headers and joining the tube and shell, a perforate tube between and joining each consecutive pair of perforate and imperforate partitions to form with the central tube an annular cylindrical pocket, a tube of larger diameter than said perforate tube joining each consecutive pair of perforate headers to form with them and the outer shell an annular discoid pocket spaced from the cylindrical pockets, a perforate cylindrical shell extending axially from said imperforate shell, an imperforate header closing the end of the perforate shell to form with an end header a radial passage communicating with the passage through the central perforate tube, a perforate member spaced from at least one of the last named headers to form a material retaining pocket, and sound absorbing material within each of said pockets.

HIRAM HAMILTON MAXIM.